United States Patent
Seo et al.

(10) Patent No.: US 10,585,976 B2
(45) Date of Patent: Mar. 10, 2020

(54) DEVICE AND METHOD FOR REPRESENTING HTML ELEMENTS HAVING 3-DIMENSIONAL INFORMATION ON WEB

(71) Applicant: Korea Institute of Science and Technology, Seoul (KR)

(72) Inventors: Daeil Seo, Seoul (KR); Byounghyun Yoo, Seoul (KR); Heedong Ko, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 260 days.

(21) Appl. No.: 15/132,957

(22) Filed: Apr. 19, 2016

(65) Prior Publication Data
US 2016/0314100 A1    Oct. 27, 2016

(30) Foreign Application Priority Data

Apr. 24, 2015  (KR) ...................... 10-2015-0057778

(51) Int. Cl.
| G06F 17/00 | (2019.01) |
| G06F 17/22 | (2006.01) |
| H04L 29/08 | (2006.01) |
| G06T 19/20 | (2011.01) |
| G06F 17/24 | (2006.01) |
| G06F 17/21 | (2006.01) |
| G06F 16/958 | (2019.01) |
| G06F 3/0481 | (2013.01) |

(52) U.S. Cl.
CPC ........ *G06F 17/2247* (2013.01); *G06F 16/986* (2019.01); *G06F 17/218* (2013.01); *G06F 17/24* (2013.01); *G06F 17/241* (2013.01); *G06T 19/20* (2013.01); *H04L 67/02* (2013.01); *G06F 3/04815* (2013.01); *G06T 2219/004* (2013.01); *G06T 2219/2016* (2013.01)

(58) Field of Classification Search
CPC ...................... G06F 17/04815; G06F 3/04815
See application file for complete search history.

(56) References Cited

U.S. PATENT DOCUMENTS 7,003,522 B1 *  2/2006  Reynar ............. G06F 17/30896
                                                      707/736
9,268,460 B1 *  2/2016  Xu ...................... G06F 3/04815
(Continued)

FOREIGN PATENT DOCUMENTS

| KR | 10-0470922 B1 | 3/2005 |
| KR | 10-0661052 B1 | 12/2006 |

(Continued)

OTHER PUBLICATIONS

Behr, Johannes, et al. "X3DOM: A DOM-based HTML5/X3D Integration Model." Proceedings of the 14th International Conference on 3D Web Technology. ACM, (2009) 127-135.

*Primary Examiner* — Andrew T McIntosh
(74) *Attorney, Agent, or Firm* — NSIP Law

(57) ABSTRACT

Disclosed is a device and method for representing HTML elements having three-dimensional (3D) information on web, the device including a virtual space providing unit configured to provide a 3D virtual space that is displayed on the web, and an HTML element placing unit configured to place an HTML element that is displayed in a 3D layout on the 3D virtual space, based on an HTML document.

19 Claims, 11 Drawing Sheets

(56) References Cited

U.S. PATENT DOCUMENTS

| | | | |
|---|---|---|---|
| 2005/0022139 A1* | 1/2005 | Gettman | G06F 16/954 |
| | | | 715/850 |
| 2005/0030309 A1* | 2/2005 | Gettman | G06Q 30/02 |
| | | | 345/419 |
| 2005/0216515 A1* | 9/2005 | Bray | G06F 16/954 |
| 2011/0010612 A1* | 1/2011 | Thorpe | G06F 16/957 |
| | | | 715/234 |
| 2013/0024764 A1* | 1/2013 | Lou | G06T 19/00 |
| | | | 715/234 |
| 2014/0289607 A1 | 9/2014 | Ko et al. | |
| 2015/0091906 A1* | 4/2015 | Dishno | G06F 17/30873 |
| | | | 345/427 |
| 2015/0091942 A1 | 4/2015 | Ko et al. | |
| 2015/0143302 A1 | 5/2015 | Chang et al. | |

FOREIGN PATENT DOCUMENTS

| | | |
|---|---|---|
| KR | 10-1380854 B1 | 4/2014 |
| KR | 10-2015-0035282 A | 4/2015 |
| WO | WO 2008/026817 A1 | 3/2008 |
| WO | 10-1512084 B1 | 4/2015 |

\* cited by examiner

FIG. 7

```
HTML tag example

<x3d>
             <Transform translation='81 0 0'>
                 <Scene>
3D                   <Shape DEF='earth'>                              Declarative
object                   <Sphere radius='3.9'/>                        3D
                         <Appearance>
                             <Material diffuseColor='1 1 1'/>
                             <ImageTexture url='images/texture_earth_clouds.jpg' />
                         </Appearance>
                     </Shape>
                 </Scene>               Web annotation
             </Transform>
         </x3d>
         <div vocab="http://schema.org" typeof="AnnotationObject" id="earth_annotation">
             <div property="translate" class="annotation_property">0, 0, 150</div>
             <div property="rotate" class="annotation_property">0, 0, 0</div>
             <div property="scale" class="annotation_property">1, 1, 1</div>
             <div property="target" class="annotation_property">#earth</div>
Annotation   <p>                                                       HTML
object           <h2>Earth</h2><br>
             Orbit Velocity: 107,218 km/h<br>
             Equatorial Circumference: 40,030 km<br>
             From Sun: 149,598,262 km<br>
             <iframe src="https://www.youtube.com/embed/thuVlax8d_w?......"></iframe>
             </p>
         </div>
```

DEVICE AND METHOD FOR REPRESENTING HTML ELEMENTS HAVING 3-DIMENSIONAL INFORMATION ON WEB

CROSS-REFERENCE TO RELATED APPLICATION

This application claims priority to Korean Patent Application No. 10-2015-57778, filed on Apr. 24, 2015, and all the benefits accruing therefrom under 35 U.S.C. § 119, the contents of which in its entirety are herein incorporated by reference.

BACKGROUND

1. Field

The present disclosure relates to a device and method for representing HTML elements on the web, and more particularly, to a device and method for representing HTML elements having three-dimensional (3D) information on the web based on an HTML document.

2. Description of the Related Art

Conventionally, HTML elements having three-dimensional (3D) information could be displayed on the web, and a user could transform the HTML elements on the 3D coordinates. However, this movement is made at a predefined viewpoint, and it is impossible to accomplish 3D transformation with free viewpoint changes of the user.

Further, conventionally, when 3D objects and HTML elements are displayed on the web, the 3D objects and the HTML elements had different layouts. Thus, when adding a description for a 3D object, a user has to generate the description as part of a 3D scene. The generated additional description conforms to representation dependent on the scene including the 3D object, such that it is impossible to use the scalability in an existing web environment.

RELATED LITERATURES

Patent Literature

Korean Patent No. 10-1380854

SUMMARY

According to an embodiment of the present disclosure, it is possible to tag a user's annotation for a three-dimensional (3D) object based on an HTML document, and thereby make full use of scalability in an existing web environment.

A device for representing HTML elements having 3D information on web according to an embodiment of the present disclosure includes a virtual space providing unit configured to provide a 3D virtual space that is displayed on the web, and an HTML element placing unit configured to place an HTML element that is displayed in a 3D layout on the 3D virtual space, based on an HTML document.

Also, the device for representing HTML elements having 3D information on web may further include a scene configuring unit configured to render an image captured by a virtual camera in the 3D virtual space to configure a 3D scene on a web browser.

Also, in the device for representing HTML elements having 3D information on web, in the case where the HTML element is in multiple numbers, each HTML element may be displayed in the same 3D layout.

Also, in the device for representing HTML elements having 3D information on web, the HTML element may include at least one of a text, an image, a video, a web page, and a uniform resource identifier (URI).

Also, in the device for representing HTML elements having 3D information on web, the HTML element may be defined using a semantic schema enabling web search.

Also, in the device for representing HTML elements having 3D information on web, the virtual space providing unit may provide a 3D virtual object in the 3D virtual space.

Also, in the device for representing HTML elements having 3D information on web, the HTML element placing unit may associate the 3D layout of the HTML element with the 3D virtual object.

Also, in the device for representing HTML elements having 3D information on web, the HTML element placing unit may move (transform) the relative position and orientation of the HTML element in the 3D virtual space with respect to the 3D virtual object in the 3D virtual space.

Also, in the device for representing HTML elements having 3D information on web, the HTML element placing unit may search for an HTML element that references an id value of the 3D virtual object, search for an attribute value of the 3D virtual object in the found HTML element, and associate the 3D virtual object with the 3D layout of the HTML element using a tag associated with the attribute value in the found HTML element.

Also, in the device for representing HTML elements having 3D information on web, depth information may be associated between the HTML element and the 3D virtual object in the 3D virtual space.

Also, in the device for representing HTML elements having 3D information on web, the HTML document may be written in accordance with the HTML 5 standard.

A method for representing HTML elements having 3D information on web according to an embodiment of the present disclosure includes providing, by a virtual space providing unit, a 3D virtual space that is displayed on the web, and placing, by an HTML element placing unit, an HTML element that is displayed in a 3D layout on the 3D virtual space, based on an HTML document.

Also, the method for representing HTML elements having 3D information on web may further include rendering, by a scene configuring unit, an image captured by a virtual camera in the 3D virtual space to configure a 3D scene on a web browser.

Also, in the method for representing HTML elements having 3D information on web, in the case where the HTML element is in multiple numbers, each HTML element may be displayed in the same 3D layout. That is, each HTML element may be written based on the same 3D layout.

Also, in the method for representing HTML elements having 3D information on web, the HTML element may include at least one of a text, an image, a video, a web page, and a URI.

Also, in the method for representing HTML elements having 3D information on web, the HTML element may be defined using a semantic schema enabling web search.

Also, in the method for representing HTML elements having 3D information on web, the providing of the 3D virtual space that is displayed on the web may include providing a 3D virtual object in the 3D virtual space.

Also, in the method for representing HTML elements having 3D information on web, the placing of the HTML element on the 3D virtual space may include associating the 3D layout of the HTML element with the 3D virtual object.

Also, in the method for representing HTML elements having 3D information on web, the placing of the HTML element on the 3D virtual space may include moving (transforming) the relative position and orientation of the HTML element in the 3D virtual space with respect to the 3D virtual object in the 3D virtual space.

Also, in the method for representing HTML elements having 3D information on web, depth information may be associated between the HTML element and the 3D virtual object in the 3D virtual space Also, in the method for representing HTML elements having 3D information on web, the HTML document may be written in accordance with the HTML 5 standard.

According to an embodiment of the present disclosure, there are advantages of placing HTML elements having a 3D layout on a 3D virtual space through an HTML document; 3D virtual objects or HTML elements can be transformed to respond to various viewpoints of a user, and an HTML element including an additional description relating to a particular virtual object can be independently modified and added.

BRIEF DESCRIPTION OF THE DRAWINGS

FIG. 7 shows an example of code associating an HTML element with a 3D virtual object.

DETAILED DESCRIPTION

Figure 1:
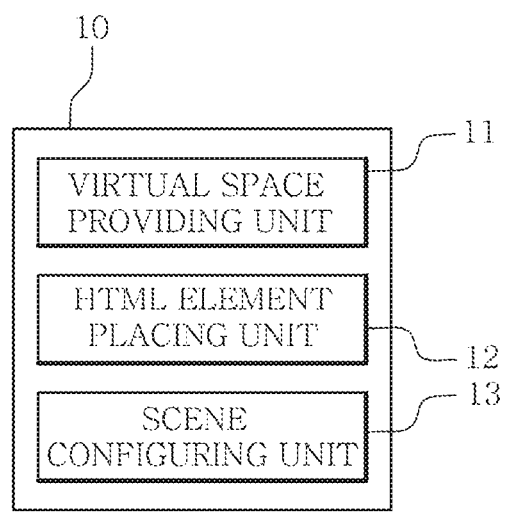
FIG. 1 is a diagram showing configuration of a device for representing HTML elements having three-dimensional (3D) information on the web according to an embodiment of the present disclosure.

The terminology used herein is for the purpose of describing particular embodiments only and is not intended to be limiting of the present disclosure. Unless otherwise expressly provided herein or the context otherwise requires, the singular forms are intended to include the plural forms as well. It will be further understood that the terms "comprises" and/or "comprising", or "includes" and/or "including" as used herein specify the presence of stated features, integers, steps, operations, elements, components, or groups thereof, but do not preclude the presence or addition of one or more other features, integers, steps, operations, elements, components, or groups thereof.

Unless otherwise defined herein, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In the drawings, like reference numerals denote like elements. However, in describing the embodiments, when a certain detailed description of related known functions or elements is deemed as unnecessarily rendering the essence of the disclosure ambiguous, their detailed description is omitted herein. In addition, the size of each element in the drawings may be exaggerated for clarity, and does not represent the actually used size.

The embodiments described herein may take the form of entirely hardware, partially hardware and partially software, or entirely software. The term "unit", "module", "device", or "system" as used herein indicates a computer-related entity such as hardware, a combination of hardware and software, or software. For example, a unit, module, device or system used herein may include, but is not limited to, a process being executed, a processor, an object, an executable, a thread of execution, a program, and/or a computer. For example, both a computer and an application running on the computer may correspond to the term unit, module, device, or system used herein.

The embodiments have been described with reference to the flowchart presented in the drawings. For the sake of simplicity, although the method has been illustrated and described as a series of blocks, the present disclosure is not limited to the order of the blocks, and some of the blocks may be placed with the other blocks in a different order from an order illustrated and described herein or may be concurrent with the other blocks, and a variety of other diverges, flow paths, and block sequences that achieve same or similar results may also be implemented. Further, the method according to an embodiment of the present disclosure may be implemented in the form of a computer program for performing a series of processes, and the computer program may also be recorded on a computer-readable recording medium.

Hereinafter, the embodiments of the present disclosure will be described in detail with the accompanying drawings.

The present disclosure places HTML elements in a three-dimensional (3D) virtual space based on an HTML document, so that all implementable commands through the HTML document can be applied to the HTML elements in the 3D virtual space. For example, HTML elements are placed in a virtual space through an HTML document, allowing the HTML elements to be seen at various viewpoints. The HTML elements can be displayed on a display, with size, position and orientation varying depending on viewpoints.

FIG. 1 is a diagram showing configuration of a device for representing HTML elements having 3D information on the web according to an embodiment of the present disclosure. Referring to FIG. 1, the device 10 for representing HTML elements having 3D information on the web includes a virtual space providing unit 11 and an HTML element placing unit 12, and in other embodiments, may further include a scene configuring unit 13.

The device 10 for representing HTML elements having 3D information on the web may be any terminal or server that can generate a program code by a user's manipulation or command and transmit and receive various types of data via a communication network. For example, the device 10 includes, but is not limited to, any one of a personal computer (PC), a laptop, a tablet PC, a smart phone, a personal digital assistant (PDA), a smart TV, a mobile communication terminal, a smart watch, and a wearable device. The communication method includes all communication methods that enable networking between objects, and is not limited to wired/wireless communication, 3G, 4G, or other methods.

The virtual space providing unit 11 may generate and provide a 3D virtual space that is displayed on the web. Also, the virtual space providing unit 11 may provide and place a 3D virtual object on the 3D virtual space. The virtual space providing unit 11 may provide the 3D virtual space to a user terminal or a web server. For example, the virtual space providing unit 11 may display the 3D virtual space on a web browser through an HTML document. Data associated with the 3D virtual space may be external data stored in a database (not shown). Also, the 3D virtual space may include a two-dimensional (2D) or 3D virtual object. Also, to display augmented reality on the web browser, the virtual space may be displayed in an overlapping manner on an image for the real space.

Also, the virtual space providing unit 11 may be implemented by a variety of 3D engines such as WebGL and CSS 3D Transform.

The HTML element placing unit 12 may place an HTML element that is displayed in the 3D layout on the 3D virtual space based on the HTML document. Each HTML element may include position, orientation and size information on the 3D virtual space.

The HTML element placing unit 12 may place the HTML element on the 3D web according to the 3D coordinate and orientation information.

The HTML element may include any object that can be displayed on the web through an HTML document. For example, the HTML element includes, but is not limited to, an image, a video, a text, a web page, a uniform resource identifier (URI), and an audio. Also, because the HTML element is implemented on the web through an HTML document, the HTML element may include a hyperlink that connects to another website through a URI.

The image included in the HTML element includes, but is not limited to, various formats of images such as PNG, JPG, and SVG. Also, the video may include a streaming image.

The scene configuring unit 13 may render an image captured by a virtual camera placed in the 3D virtual space and display the image on the web browser. Specifically, the scene configuring unit 13 may configure a 3D scene on the web browser. Also, the position and viewpoint of the virtual camera may be determined based on information inputted from a sensor (not shown). The sensor may include at least one of a global positioning system (GPS), a tilt sensor, an acceleration sensor, a camera, a pressure sensor, and a geomagnetic field sensor. Also, the sensor may be included in the device 10.

Figure 2:
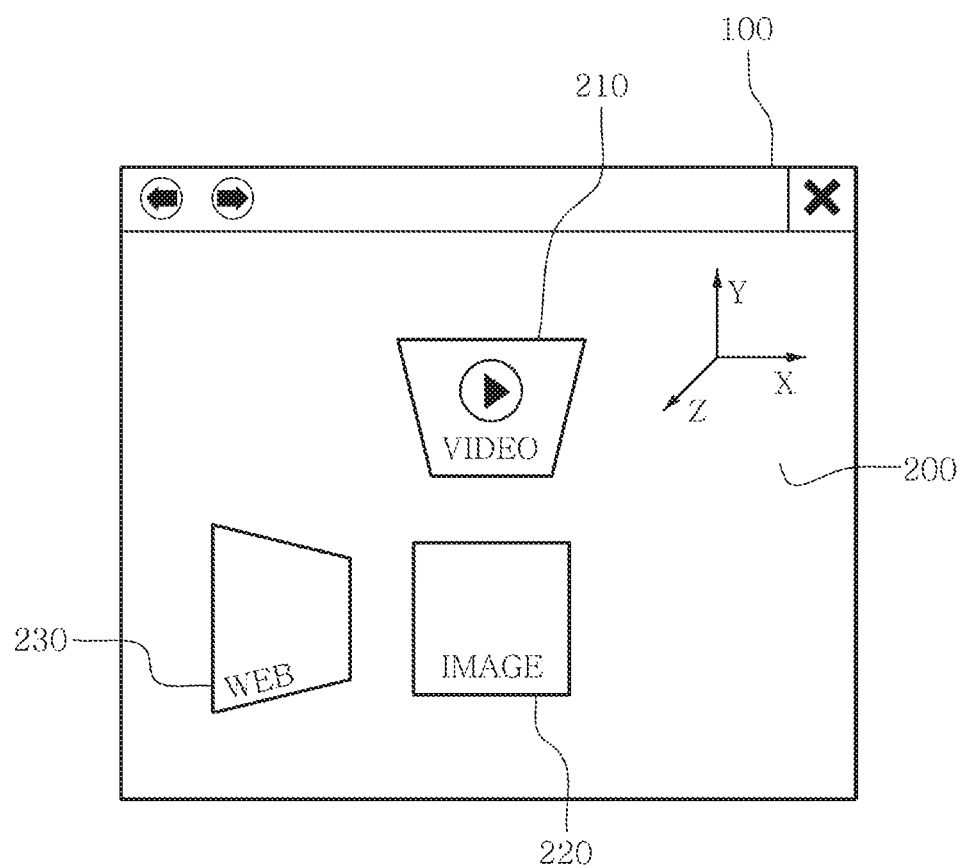
FIG. 2 is an example of a web browser displaying HTML elements having 3D information on the web according to an embodiment of the present disclosure.

FIG. 2 is an example of a web browser displaying HTML elements having 3D information on the web according to an embodiment of the present disclosure. Referring to FIG. 2, a 3D virtual space 200 is displayed on the web browser 100. The 3D virtual space 200 may be provided by the virtual space providing unit 11. The HTML element placing unit 12 may place HTML elements 210-220 on the 3D virtual space 200. In FIG. 2, a video 210, an image 220, and a web page 230 are shown as examples of the HTML elements.

As shown in FIG. 2, when a plurality of HTML elements is present on the virtual space 200, each HTML element may be displayed in the same 3D layout. That is, the HTML elements may share the same virtual camera viewpoint and 3D rendering layout context. Thus, each HTML element placed on the 3D virtual space may be moved (transformed) and displayed in response to a change in position or orientation of the virtual camera.

Figure 3A:
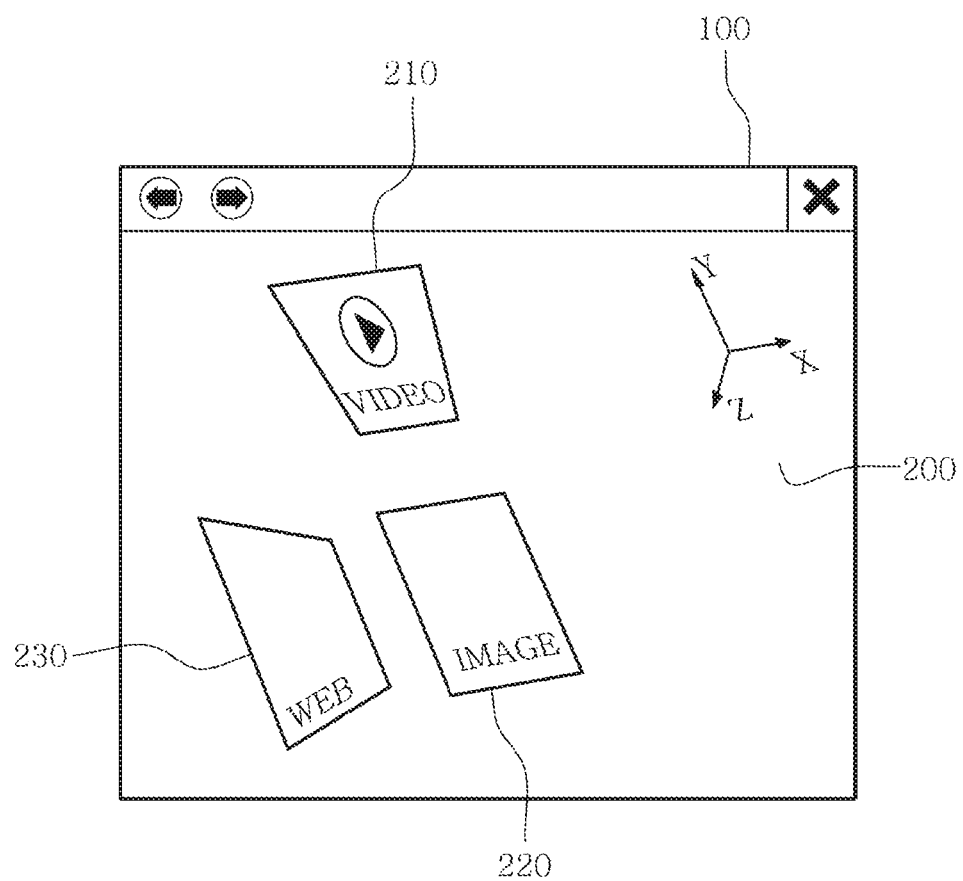
FIG. 3A shows a shape change of HTML elements displayed on the web browser with a position change of a virtual camera of FIG. 2.

FIG. 3A shows a shape change of the HTML elements displayed on the web browser with a position change of the virtual camera of FIG. 2. In FIG. 3A, because the HTML elements are displayed in the same 3D layout, the HTML elements are all changed and displayed in response to changes in position and orientation of the virtual camera. Specifically, FIG. 3A shows a scene for an image captured by the virtual camera of FIG. 2 that is rotated in the counterclockwise direction and moved a bit in the anterior direction (−z). Thus, each HTML element 210-230 is displayed on the web browser to be larger in size and tilted in the counterclockwise direction.

Figure 3B:
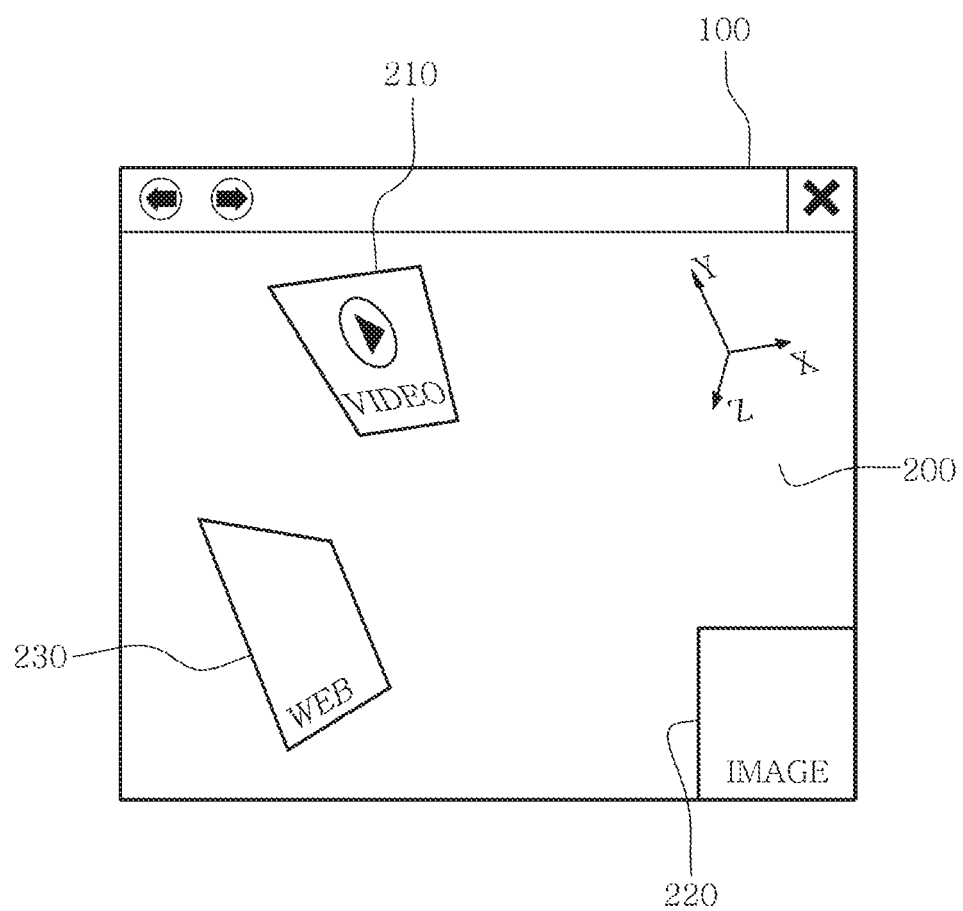
FIG. 3B is a diagram for describing an HTML element positioned static at a particular location that is displayed on the web browser.

FIG. 3B is a diagram for describing an HTML element positioned static at a particular location that is displayed on the web browser. In another embodiment, the HTML element placing unit 12 may place at least one HTML element 220 to be positioned static at a particular location on the web browser. That is, at least one of the plurality of HTML element placed on the 3D virtual space is displayed in a different 3D layout from the other HTML elements, and does not move to respond to the position or orientation of the virtual camera.

Referring to FIG. 3B, the HTML element 220 is placed at the bottom right corner of the web browser, and even though the other HTML elements (e.g., 210, 230) are changed in position and orientation with a change in position of the virtual camera, the HTML element 220 does not change in response thereto. An HTML element including information to be provided to a user irrespective of a change in the user's viewpoint may be fixed at a particular position as above.

Figure 3C:
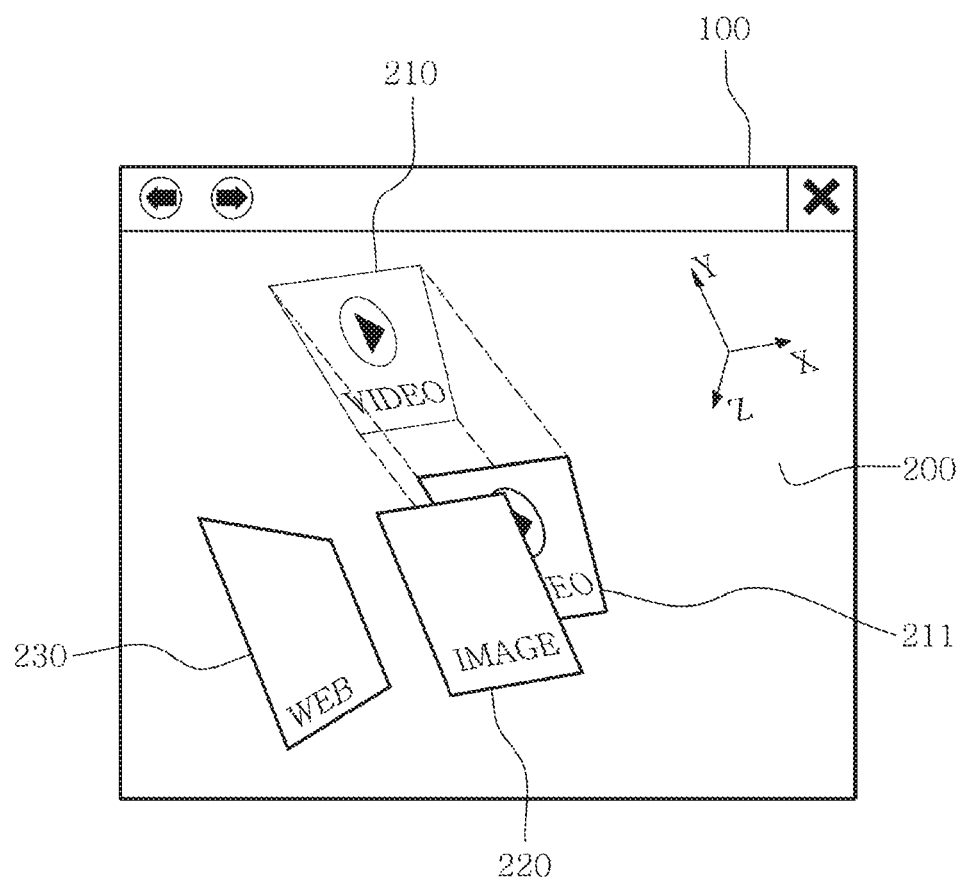
FIG. 3C is a diagram for describing a motion of an HTML element to individually change the position of HTML elements in a 3D virtual space.

FIG. 3C is a diagram for describing a motion of the HTML element to individually change the position of the HTML elements in the 3D virtual space. The HTML elements in the 3D virtual space may be positioned static at particular locations or may be changed in position and orientation. Referring to FIG. 3C, the HTML elements 220 and 230 are positioned static at particular locations, while the HTML element 210 is changed in position and orientation in the 3D virtual space and moved to the back face of the HTML element 220. That is, in FIG. 3C, an HTML element 211 denotes the moved HTML element 210.

In an embodiment of the present disclosure, HTML elements may be dynamically moved to preset positions in a repeated manner, or may be moved to preset positions according to a particular situation. Alternatively, HTML elements may be freely changed in position by the user input. HTML elements that can be changed in position in the 3D virtual space include, but are not limited to, those displayed in the same 3D layout as other HTML elements. Even in the event that HTML elements are displayed in different 3D layouts, a particular HTML element may be moved on the 3D space.

The change in the position and orientation of the virtual camera is the user's viewpoint change, and may vary depending on the user input. Also, the user input may be performed through a sensor of a portable (or wearable) terminal including a mouse, a keyboard, or the device 10.

Figure 4:
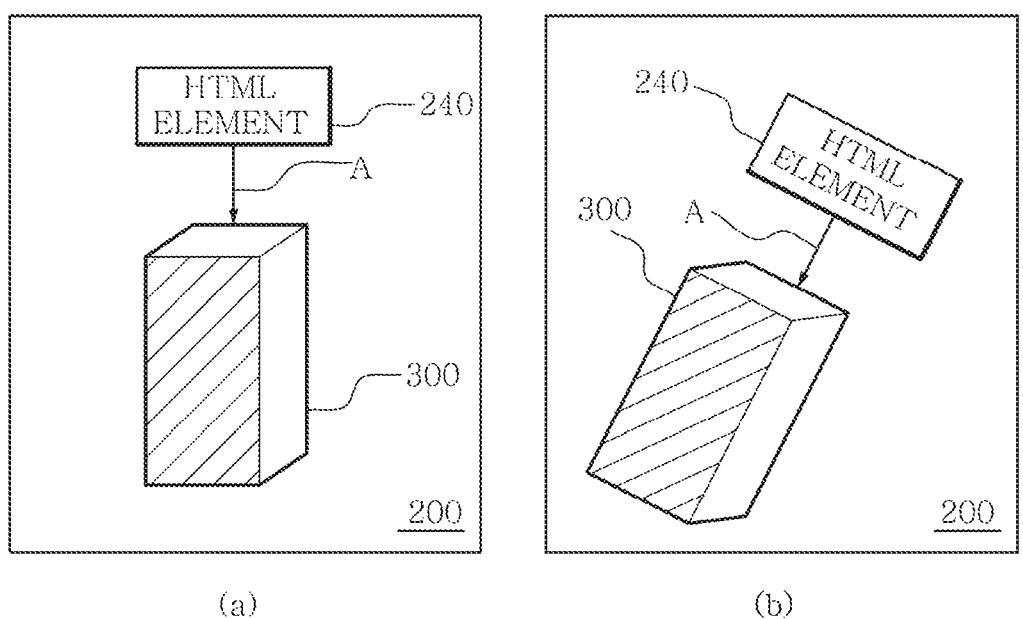
FIG. 4 shows a scene change in a 3D virtual space including a 3D virtual object and an HTML element.

FIG. 4 shows a scene change in the 3D virtual space including a 3D virtual object and an HTML element. Referring to FIG. 4, the 3D virtual object and the HTML element are moved and displayed in 3D with the user's viewpoint change ((a)→(b)) (i.e., a viewpoint change of the virtual camera in the 3D virtual space). That is, virtual objects and HTML elements can share the same virtual camera viewpoint and 3D rendering layout context.

Thus, each HTML element placed on the 3D virtual space may be moved (transformed) and displayed in response to a change in position or orientation of the virtual camera. Through this, the user can see HTML elements and 3D virtual objects in the virtual space represented in an HTML document with desired orientation, position and size. Here, the virtual space providing unit 11 can provide the 3D virtual object onto the virtual space via XML.

To do so, the HTML element placing unit 12 may associate the 3D layout of the HTML element with the 3D virtual object. For example, in defining HTML elements through an HTML document, the HTML element placing unit 12 may tag the 3D virtual object that becomes a target, thereby associating the 3D layout of the HTML element with the 3D virtual object. Thus, the associated HTML element may be displayed as annotation on the associated 3D virtual object. Also, to mark the annotation, a separate marker connecting the HTML element and the 3D virtual object may be displayed on the web (e.g., (A) of FIG. 4).

For a 3D virtual object "earth" described in X3D format, FIG. 7 illustrates an example of the code associating the HTML element with the 3D virtual object by tagging the HTML element through an HTML document. The upper column is a part representing the 3D virtual object, and the lower column shows the HTML element (annotation object). Also, the HTML element targets the 3D virtual object for tagging.

In an embodiment, the HTML element placing unit may search for an HTML element (Annotation object) that references an id value of the 3D virtual object, search for an attribute value of the 3D virtual object ("earth" in the above example) in the found HTML element, and associate the 3D virtual object with the 3D layout of the HTML element using a tag (a div tag having '# earth' among div tags) associated with the attribute value in the found HTML element.

For example, the HTML element placing unit 12 may define a relationship between the HTML element and the 3D virtual object using the code such as the below. For example, the HTML element placing unit 12 searches for an HTML element that references an id value of the 3D virtual object. Subsequently, the HTML element placing unit 12 searches for an 'earth' value defined as a DEF attribute within the 3D virtual object from the annotation object (HTML element). The HTML element placing unit 12 selects a div tag having '# earth' from div tags having a property attribute value of 'target'.

Subsequently, the HTML element placing unit 12 should select an annotation object including the selected tag, and finds a div tag including div and a typeof attribute of 'AnnotationObject' at the moment. In the above example, the HTML element placing unit 12 selects a div tag (see the topmost line of the HTML element code) with an id attribute of 'earth_annotation'.

When the annotation object is selected through this process, the HTML element placing unit 12 applies information associated with transform within the selected annotation object to the annotation object. Here, a reference position of the annotation object corresponds to position information of the 3D object, and in this example, it is defined as (81, 0, 0) according to Shape DEF='earth'. Subsequently, a final position at which the annotation object is to be placed in the 3D space may be determined by translate, rotate, and scale values defined in the property attribute of the div tag defined within the annotation object. The transform information may be executed using a method such as CSS3D transform.

As described above as an example, in defining HTML elements through an HTML document, the HTML element placing unit 12 may tag the 3D virtual object defined as 'earth' to be annotated using '# earth', to indicate that the HTML element and the 3D virtual object are associated with each other. Also, the HTML element may be displayed as annotation while maintaining a relative position from the associated 3D virtual object, with the 3D layout of the HTML element and the 3D virtual object sharing the same virtual camera viewpoint and 3D rendering layout context.

Also, in an example, the HTML element associated with the virtual object may include various pieces of information inputted from users through the web. The HTML element tagged for the 3D virtual object as described above may be displayed as annotation (A) on the virtual object 300 as shown in FIG. 4. Through the annotation (A), the user can clearly identify the 3D virtual object with which the HTML element is associated. Also, by tagging an HTML element for a particular virtual object, the user can add annotation on the web and provide an additional description or his/her comments on the target virtual object in the annotation.

Also, the HTML element placing unit 12 may define a relationship (web annotation) between the HTML element and the target object (e.g., a 3D virtual object or other HTML element) or the HTML element using a semantic schema enabling web search. The semantic schema enabling web search includes any schema that defines semantic like existing web content, and may be interpreted by an existing search engine according to the type of schema. For example, the semantic schema enabling web search includes, but is not limited to, the schema standard provided by schema.org.

Through this, the HTML element serving as annotation on the target object can be used by a search engine without an additional operation.

In an example, to tag the HTML element for the target object, the HTML element placing unit 12 may define an additional schema as shown in the following Table and use a property value.

In the following Table, HTML elements are based on MediaObject schema defined in schema.org.

| Schema | Property | Range | Description |
| --- | --- | --- | --- |
| Thing | | | Most generic type of thing |
| | url | URL | URL of the thing |
| | Name | Text | Name of the thing |
| | Description | Text | Short description of the thing |
| | sameAs | URLs | URL of a reference Web page that unambiguously indicates the item's identity |
| MediaObject | | | An image, video, or audio object embedded in a web document |
| AnnotationObject | | | annotations on a 3D target object by MediaObject |
| | target | URL | 3D target object's DEF attribute value of the annotation |
| | translate | Integers | Defines a translation |
| | rotate | Integers | Defines a rotation (degree) |
| | scale | Integers | Defines a scale transformation |
| | contentURL | URL | URL of an external web page to annotate on 3D target object |

Here, MediaObject indicates a schema for representing multimedia content such as an image, a video, and an audio, and is a specific schema of Thing that stands for a generic object. Also, a relationship between an HTML element serving as annotation and a virtual object that becomes a target may be described within an HTML document through formats including, but not limited to, microdata, microformat, JSON-LD (JSON for Linking Data), and RDFa (Resource Description Framework in Attributes).

In an example, the HTML element placing unit 12 may move (transform) the relative position and orientation of the HTML element with respect to the 3D virtual object in the 3D virtual space. This can be realized by sharing of the layout of the HTML element and the 3D virtual object.

Figure 5A:
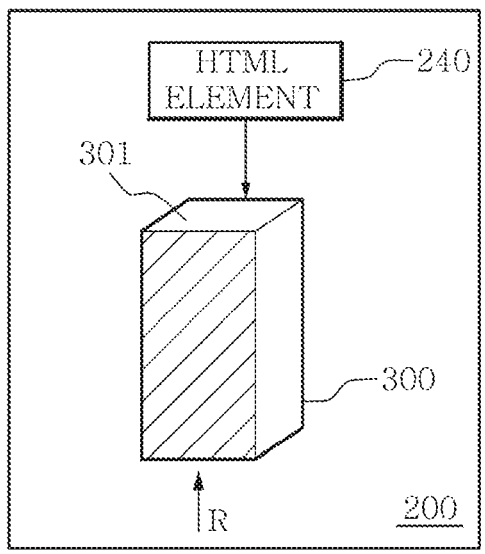
FIGS. 5A-5C are diagrams for describing the shape that is displayed when a 3D virtual object is associated with depth information of an HTML element.
Figure 5B:
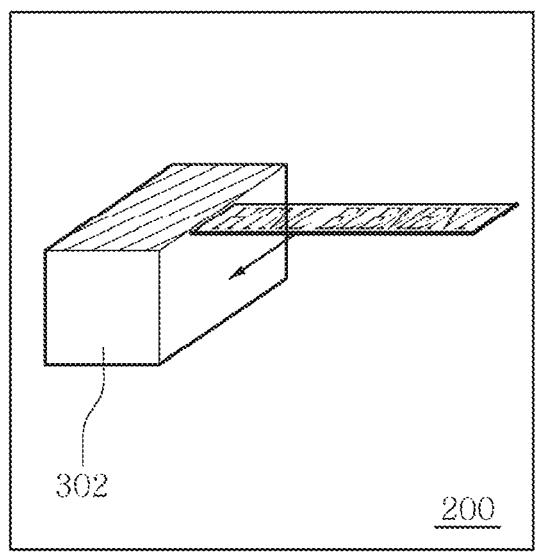
Figure 5C:
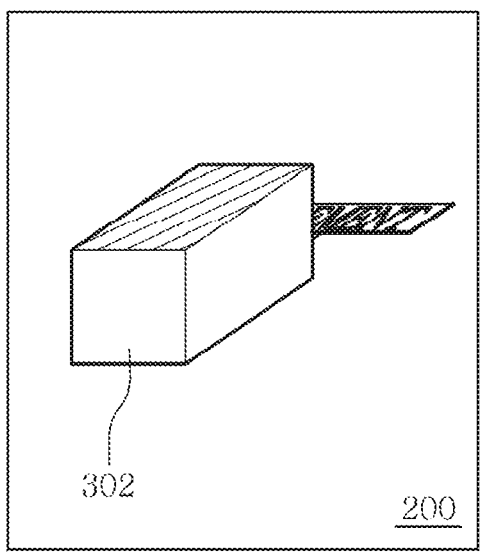

FIGS. 5A-5C are diagrams for describing the shape that is displayed when the 3D virtual object is associated with depth information of the HTML element. Referring to FIG. 5A-5C, when the virtual object 300 is viewed from the direction R of FIG. 5A, if depth information is not associated between the virtual object 300 and the HTML element 240, a scene is configured such that the virtual object 300 and the HTML element 240 overlap as shown in FIG. 5B. However, according to an embodiment of the present disclosure, as the virtual object 300 is associated with depth information of the HTML element 240, an element placed behind depending on viewpoints may not be displayed as shown in FIG. 5C. For example, the scene configuring unit 13 can prevent an overlap between objects when configuring a scene using the depth information.

That is, according to an embodiment of the present disclosure, the HTML element and the 3D virtual object in the 3D virtual space can share the same virtual camera viewpoint and 3D rendering layout context.

Figure 6:
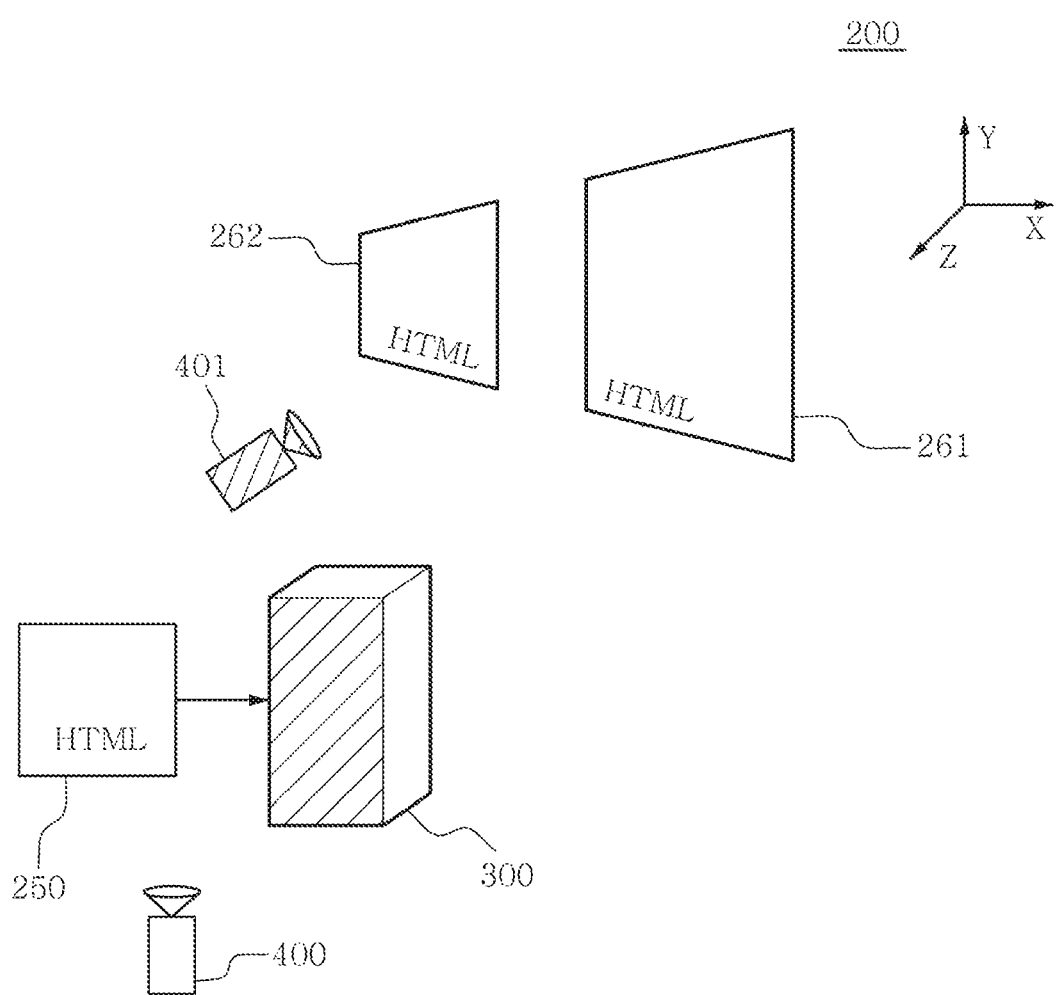
FIG. 6 shows an example of a 3D virtual space according to an embodiment of the present disclosure.

FIG. 6 shows an example of the 3D virtual space according to an embodiment of the present disclosure. Specifically, in FIG. 6, an HTML element 250 tag the 3D virtual object 300, and HTML elements 261 and 262 exist independently. Referring to FIG. 6, the user can change a scene that is displayed on the web browser by freely moving a virtual camera 400. Thus, in FIG. 6, while the HTML element 262 is displayed in small size, but when the virtual camera is moved to the location of 401, the HTML element 262 will be predominantly displayed on the web browser.

In an embodiment of the present disclosure, the HTML document may be an HTML document written in accordance with the HTML 5 standard. Accordingly, it is obvious that all arbitrary functions provided by HTML 5 can be applied to the HTML elements in the present disclosure.

Also, in an embodiment, the HTML element placing unit 12 may tag and place at least one HTML element in a particular part of the virtual object. Here, the virtual object includes any media content. The media content may include text, N-dimensional image (where N is an integer), video, and audio content.

In an example, a media file analysis unit (not shown) may analyze a media content file and generate an HTML element including specific information of the media content file. That is, the media file analysis unit may convert a particular media content file to an HTML element.

The specific information of the media content file may include information for identifying a particular visual part or particular temporal part of the media content.

For example, in FIGS. 5A-5C, as information is generated for each of a top face 301 and a bottom face 302 of the 3D virtual object 300, the HTML placing unit 12 may allow the user to add annotation by tagging the HTML element 240 in a necessary part of the 3D virtual object such as the top face 301 or the bottom face 302. Also, when the virtual object is audio content, annotation may be attached by tagging an HTML element for a particular audio section. Through this, the user can input or modify desired information for a particular part of the virtual object.

Also, in an example, the media content may include an image and a text created based on an HTML document. The image created by the HTML document may be in SVG file format, but is not limited thereto.

A method for representing HTML elements having 3D information on the web according to an embodiment of the present disclosure may include the steps of providing, by the virtual space providing unit, a 3D virtual space that is displayed on the web, and placing, by the HTML element placing unit, an HTML element that is displayed in a 3D layout on the 3D virtual space based on an HTML document. The method for representing HTML elements having 3D information on the web may be implemented by the above-described device for representing HTML elements having 3D information on the web.

In an embodiment, the method for representing HTML elements having 3D information on the web may further include the step of rendering, by the scene configuring unit, an image captured by a virtual camera in the 3D virtual space and configuring a 3D scene on a web browser. Also, in the case where the HTML element is in multiple numbers, each HTML element may be displayed in the same 3D layout.

The HTML element includes, but is not limited to, at least one of a text, an image, a video, a web page, and a URI. Also, the HTML element may be defined using a semantic schema enabling web search. Accordingly, the specific content of the HTML element may be searched for by a search engine such as Google and Yahoo.

The step of providing the 3D virtual space that is displayed on the web may include providing a 3D virtual object in the 3D virtual space. For example, an external file may be retrieved and placed in the 3D virtual space, or a 3D virtual object generated through HTML may be placed on the 3D virtual space.

Also, the step of placing the HTML element on the 3D virtual space may include associating the 3D layout of the HTML element with the 3D virtual object. By associating the 3D layout, the user viewpoint (e.g., virtual camera) may be shared.

The step of placing the HTML element on the 3D virtual space may include moving (transforming) the relative position and orientation of the HTML element in the 3D virtual space with respect to the 3D virtual object in the 3D virtual space.

Also, for the HTML element and the 3D virtual object in the 3D virtual space, depth information may be associated with each other.

Also, in an example, the HTML document may be written in accordance with the HTML 5 standard, but is not limited thereto.

While the present disclosure has been hereinabove described with reference to the disclosed embodiments, this is provided for illustration only and it will be understood by those skilled in the art that various modifications in form and details may be made thereto. However, it should be construed that such modifications fall within the technical scope of protection of the present disclosure. Therefore, the genuine technical scope of protection of the present disclosure shall be defined by the technical concept of the appended claims.

What is claimed is:

1. A device to represent HTML elements having three-dimensional (3D) information on web, the device comprising:
   a processor configured to
      provide a 3D virtual space that is displayed on the web,
      search to find HTML elements defined in an HTML document that reference an id value of a 3D virtual object,
      search for an attribute value of the 3D virtual object in the found HTML elements,
      associate the 3D virtual object with a 3D layout of the HTML elements using a tag associated with the attribute value in the found HTML elements,
      place the HTML elements on the 3D virtual space in the 3D layout based on the HTML document,
      search for a value defined as a DEF attribute within the 3D virtual object from the HTML element,
      select a div tag having a hash value from among div tags having a target property attribute value,
      select an annotation object that includes the selected div tag, and
      apply information associated with a transform within the annotation object, to the annotation object, such that a reference position of the annotation object corresponds to position information of the 3D object.

2. The device according to claim 1, wherein the processor comprises
   a virtual space provider configured to perform the providing the 3D virtual space that is displayed on the web, and
   an HTML element placer configured to
   perform the search to find the HTML elements defined in the HTML document that reference the id value of the 3D virtual object,
   perform the search for the attribute value of the 3D virtual object in the found HTML elements,
   perform the association of the 3D virtual object with the 3D layout of the HTML elements using the tag associated with the attribute value in the found HTML elements, and
   perform the placement of the HTML elements on the 3D virtual space in the 3D layout based on the HTML document.

3. The device according to claim 2, further comprising:
   a scene configurer configured to render an image captured by a virtual camera in the 3D virtual space to configure a 3D scene on a web browser.

4. The device according to claim 2, wherein the HTML elements comprise any one or any combination of any two or more of a text, an image, a video, a web page, and a uniform resource identifier (URI).

5. The device according to claim 2, wherein the HTML elements are defined using a semantic schema enabling web search.

6. The device according to claim 2, wherein the HTML documents are written in accordance with HTML 5 standard.

7. The device according to claim 2, wherein the 3D virtual object is in the 3D virtual space.

8. The device according to claim 7, wherein the HTML elements placer is further configured to transform a relative position and orientation of the HTML elements in the 3D virtual space with respect to the 3D virtual object in the 3D virtual space, by sharing of a layout of at least one HTML element of the HTML elements with the 3D virtual object.

9. The device according to claim 8, wherein depth information is associated between the HTML elements and the 3D virtual object in the 3D virtual space.

10. The device according to claim 1, further comprising a memory configured to store instructions, wherein the processor is further configured to execute the instructions to
    provide the 3D virtual space that is displayed on the web,
    search to find the HTML elements defined in the HTML document that reference the id value of the 3D virtual object,
    search for the attribute value of the 3D virtual object in the found HTML elements,
    associate the 3D virtual object with the 3D layout of the HTML elements using the tag associated with the attribute value in the found HTML elements, and
    place the HTML elements on the 3D virtual space in the 3D layout based on the HTML document.

11. A method to represent HTML elements having three-dimensional (3D) information on web, the method comprising:
    providing, by a virtual space provider, a 3D virtual space that is displayed on the web;
    searching, by an HTML element placer, to find HTML elements defined in an HTML document that reference an id value of a 3D virtual object;
    searching, by the HTML element placer, for an attribute value of the 3D virtual object in found HTML elements;
    associating, by the HTML element placer, the 3D virtual object with a 3D layout of the HTML elements using a tag associated with the attribute value in the found HTML elements;
    placing, by the HTML element placer, the HTML elements on the 3D virtual space in the 3D layout based on the HTML document;
    searching, by the HTML element placer, for a value defined as a DEF attribute within the 3D virtual object from the HTML element;
    selecting, by the HTML element placer, a div tag having a hash value from among div tags having a target property attribute value;
    selecting, by the HTML element placer, an annotation object that includes the selected div tag; and
    applying, by the HTML element placer, information associated with a transform within the annotation object, to the annotation object, such that a reference position of the annotation object corresponds to position information of the 3D object.

12. The method according to claim 11, further comprising:
    rendering, by a scene configurer, an image captured by a virtual camera in the 3D virtual space to configure a 3D scene on a web browser.

13. The method according to claim 11, wherein the HTML elements comprise any one or any combination of any two or more of a text, an image, a video, a web page, and a uniform resource identifier (URI).

14. The method according to claim 11, wherein the HTML elements are defined using a semantic schema enabling web search.

15. The method according to claim 11, wherein the 3D virtual object is in the 3D virtual space.

16. The method according to claim 15, wherein the placing of the HTML elements on the 3D virtual space comprises transforming a relative position and orientation of the HTML elements in the 3D virtual space with respect to the 3D virtual object in the 3D virtual space, by sharing of a layout of at least one HTML element of the HTML elements with the 3D virtual object.

17. The method according to claim 16, wherein depth information is associated between the HTML elements and the 3D virtual object in the 3D virtual space.

18. The method according to claim 11, wherein the HTML documents are written in accordance with HTML 5 standard.

19. The method of claim 11, further comprising determining a final position to place the annotation object based on translate, rotate, and scale values defined in a property attribute of the div tag, which is defined within the annotation object.

* * * * *